United States Patent
Korn et al.

(10) Patent No.: US 11,498,126 B2
(45) Date of Patent: Nov. 15, 2022

(54) METHOD FOR PRODUCING A COMPONENT, IN PARTICULAR VEHICLE COMPONENT, AND CORRESPONDINGLY PRODUCED COMPONENT

(71) Applicant: MAN Truck & Bus AG, Munich (DE)

(72) Inventors: Matthias Korn, Erlangen (DE); Peter Scharf, Nuremberg (DE)

(73) Assignee: MAN TRUCK & BUS AG, Munich (DE)

( * ) Notice: Subject to any disclaimer, the term of this patent is extended or adjusted under 35 U.S.C. 154(b) by 565 days.

(21) Appl. No.: 16/282,636

(22) Filed: Feb. 22, 2019

(65) Prior Publication Data
US 2019/0262904 A1     Aug. 29, 2019

(30) Foreign Application Priority Data

Feb. 23, 2018 (DE) .......................... 102018104103.9

(51) Int. Cl.
*B22F 5/00*       (2006.01)
*B23K 26/352*    (2014.01)
(Continued)

(52) U.S. Cl.
CPC .............. *B22F 5/008* (2013.01); *B23K 9/044* (2013.01); *B23K 10/027* (2013.01);
(Continued)

(58) Field of Classification Search
None
See application file for complete search history.

(56) References Cited

U.S. PATENT DOCUMENTS

| | | |
|---|---|---|
| 3,595,590 A | 7/1971 | Beyer |
| 9,765,727 B2 | 9/2017 | Evers et al. |

(Continued)

FOREIGN PATENT DOCUMENTS

| | | |
|---|---|---|
| DE | 102009030683 A1 | 1/2011 |
| DE | 102015012095 A1 | 3/2017 |

(Continued)

OTHER PUBLICATIONS

Communication under Article 94(3) EPC issued in European Patent Application No. 19155346.0 dated Jun. 23, 2022. English translation not available.

(Continued)

*Primary Examiner* — Patricia L. Hailey
*Assistant Examiner* — Christopher D. Moody
(74) *Attorney, Agent, or Firm* — Weber Rosselli & Cannon LLP

(57) ABSTRACT

The disclosure relates to a method for producing a component, in particular a vehicle component or an engine component, such as a piston of an internal combustion engine. The method comprises forming a first body region, in particular by means of casting or forging. The method includes forming a second body region, which is connected to the first body region, from an aluminium alloy or an iron-based alloy or a copper-based alloy by means of an additive manufacturing method. The second body region is alloyed in such a manner that it has higher thermal stability, higher mechanical strength or higher wear resistance upon tribological stressing than the first body region.

20 Claims, 2 Drawing Sheets

(51) Int. Cl.
*F02F 3/00* (2006.01)
*F02F 3/12* (2006.01)
*B23K 26/342* (2014.01)
*B23K 10/02* (2006.01)
*B23K 15/00* (2006.01)
*B23K 9/04* (2006.01)
*B23P 15/10* (2006.01)
*F02F 3/14* (2006.01)
*B33Y 10/00* (2015.01)
*B33Y 80/00* (2015.01)
*B23K 101/00* (2006.01)
*B22F 7/08* (2006.01)
*B22F 7/06* (2006.01)
*C22C 1/04* (2006.01)
*B22F 10/20* (2021.01)

(52) U.S. Cl.
CPC ........ *B23K 15/0086* (2013.01); *B23K 26/342* (2015.10); *B23K 26/3584* (2018.08); *B23P 15/10* (2013.01); *F02F 3/0084* (2013.01); *F02F 3/12* (2013.01); *F02F 3/14* (2013.01); *B22F 7/062* (2013.01); *B22F 7/08* (2013.01); *B22F 10/20* (2021.01); *B22F 2999/00* (2013.01); *B23K 2101/003* (2018.08); *B33Y 10/00* (2014.12); *B33Y 80/00* (2014.12); *C22C 1/0416* (2013.01); *F02F 2200/00* (2013.01)

(56) References Cited

U.S. PATENT DOCUMENTS

| | | |
|---|---|---|
| 2013/0025561 A1 | 1/2013 | Gabriel et al. |
| 2014/0299091 A1 | 10/2014 | Ribeiro et al. |
| 2015/0247474 A1 | 9/2015 | Evers et al. |
| 2019/0218996 A1* | 7/2019 | Mori .......................... F16J 1/01 |

FOREIGN PATENT DOCUMENTS

| | | |
|---|---|---|
| DE | 102015012139 A1 | 3/2017 |
| DE | 102017214518 A1 | 2/2018 |
| JP | S6256562 A | 3/1987 |
| WO | 2017029186 A1 | 2/2017 |
| WO | 2017203779 A1 | 11/2017 |

OTHER PUBLICATIONS

Notification of Second Office Action issued in Chinese Patent Application No. 201910133952.3 dated Jun. 20, 2022, with English translation.

Russian Office Action issued in Russian Application No. 2019104699/11 dated Jul. 29, 2022, with English translation.

* cited by examiner

METHOD FOR PRODUCING A COMPONENT, IN PARTICULAR VEHICLE COMPONENT, AND CORRESPONDINGLY PRODUCED COMPONENT

BACKGROUND

The disclosure relates to a method for producing a component, in particular a vehicle component and/or an engine component, such as a piston of an internal combustion engine.

WO 2017/029186 A1 discloses a steel or aluminium piston for a combustion engine. The piston has a cooling duct in which pins extend and/or which has undulations, thickened portions and/or tapered portions. In the case of a method for producing at least part of such a steel or aluminium piston for a combustion engine, use is made of an additive manufacturing method. The additive manufacturing method is used in order to produce shapes which have hitherto scarcely been able to be produced, if at all.

U.S. Pat. No. 9,765,727 B2 discloses a method for producing a piston. The method comprises the casting or forging of the piston as a single-part piece with an open cooling gallery from a cost-effective first material, such as steel, cast iron or aluminium. The method furthermore comprises the formation of part of the surface of a combustion chamber, which is a small region of the piston which is directly exposed to the combustion chamber, from a second material by additive manufacturing. The second material has higher heat conductivity and a higher resistance to oxidation, erosion and oil coking than the first material. In detail, it is disclosed that the second material differs from the first material and is selected from the materials including stainless steel, a nickel-based alloy and a nickel-chromium-based alloy.

US 2014/0299091 A1 discloses a piston body which consists of a first part and a second part which contains a crown part with an upper combustion surface and an at least partially closed oil gallery. The first part and the second part are joined together at a connecting point which is located on a side of the oil duct opposite the upper combustion surface. The first part is produced by casting or forging. The second part is produced by an additive production process, for example direct laser sintering of metal. The second part is composed of a material which has increased oxidation resistance in comparison to the first part. By means of the production method, certain geometrical features, such as oil galleries or combustion depressions, can be produced.

In the known prior art, an additive manufacturing method is therefore used for forming complex geometries or for providing higher heat conductivity and higher resistance to oxidation, erosion and oil coking.

SUMMARY

The disclosure is based on the object of providing an alternative and/or improved production method for a component, in particular a vehicle component and/or an engine component, such as a piston of an internal combustion engine. In particular, a component which withstands high thermal and/or tribological loadings is intended to be able to be produced by means of the production method. Furthermore, care can be taken here to ensure a particularly good (strong) connection to the first body region, a particularly economical alloy structure and a particularly economical manufacturing method.

The object is achieved by the features according to the developments specified in the the description.

The method serves for producing a component, in particular a vehicle component and/or an engine component (for example part of a motor vehicle engine, stationary engine, gas engine, diesel engine, petrol engine, a turbine, etc.), such as a piston of an internal combustion engine. The method comprises forming (for example producing, building, etc.) a first body region, in particular by means of casting and/or forging. The method comprises forming (for example producing, building, etc.) a second body region which is connected (for example directly or indirectly) to the first body region, from an aluminium alloy or an iron-based alloy (for example, steel, cast-iron alloy) or a copper-based alloy by means an additive manufacturing method. The second body region is alloyed in such a manner that it has higher thermal stability, higher mechanical strength and/or higher wear resistance upon tribological stressing than the first body region.

The method therefore provides a component by means of a hybrid production method in which the second body region is produced in an advantageous manner, for example from an aluminium alloy, by means of an additive manufacturing method. The component therefore forms a hybrid component. By means of the additive manufacturing method, the second body portion can be alloyed in order to have such high thermal stability and mechanical strength, in particular at high homologous temperatures, as is scarcely possible, if at all, in a conventional manner, for example by means of casting or forging, in a component, in particular a piston composed of an aluminium alloy or an iron-based alloy or a copper-based alloy. The high thermal stability and mechanical strength are important, for example, during the use of the aluminium alloy since aluminium per se has low thermal stability and mechanical strength compared, for example, with steel. By contrast to the prior art known from U.S. Pat. No. 9,765,727 B2, in particular the focus is in particular not on higher thermal conductivity of the second body region since aluminium per se already has high thermal conductivity compared, for example, with steel.

The first body region and the second body region can expediently be produced by means of different manufacturing methods. In particular, only the second body region can be produced by means of an additive manufacturing method. The first body region can be produced for example by means of a conventional manufacturing method.

It is possible for the first body region to have a plurality of interconnected portions (connected, for example, by means of friction welding, induction welding, laser welding, hybrid welding) which can be produced by means of a conventional manufacturing method. It is also possible for the first body region to be connected to further body regions (connected, for example, by means of friction welding, induction welding, laser welding, hybrid welding) which can be produced by means of a conventional manufacturing method. For example, the portions or further body regions can likewise be connected to the second body region. In particular, the portions or further body regions can likewise be connected to one another and/or to the first body region before, during or after the formation of the second body region.

The additive manufacturing method can comprise, for example, laser sintering, laser melting, electron beam sintering and/or electron beam melting.

In a further embodiment, a metallic powder or a plurality of different metallic powders is/are fused in the additive manufacturing method in order to form the second body region.

In a variant embodiment, the second body region has a graded alloy content and/or is alloyed inhomogenously (for example has a content of alloy elements that changes along a gradation axis). Alternatively or additionally, an alloy content of an alloy element or of a plurality of alloy elements changes (for example increases or decreases) (for example gradually, by degrees, successively, step by step) in the second body region with increasing distance from the first body region (for example distance from a contact surface of the first body region in contact with the second body region) and/or with decreasing distance from an (in particular thermally or mechanically highly stressed) component surface of the second body region (or of the component).

Different portions having at least partially different properties can therefore be provided within the second body region. In particular, the properties can thereby be improved and at the same time costs for expensive alloy elements reduced. In order to provide the gradation or inhomogeneous alloying, different starting materials, for example different metallic powders, can be fused, for example successively, by means of the additive manufacturing method.

In one exemplary embodiment, the method furthermore comprises roughening a contact surface, which is to be connected to the second body region, of the first body region, in particular by means of laser roughening or electron beam roughening. Alternatively or additionally, the method comprises roughening a contact surface, which is to be connected to the first body region, of the second body region, in particular by means of laser roughening or electron beam roughening. The roughening can improve a connection and durability of the connection between the first body region and the second body region.

For example, a surface roughness within an mm range or a μm range can be provided by means of the roughening.

In a development of the method, the roughening of the contact surface and the forming of the second body region are carried out in the same manufacturing plant (for example electron beam or laser beam manufacturing plant). As a result, the plant does not have to be changed. This can save costs and time and also a further separate manufacturing plant.

In a further embodiment, the second body region has higher thermal stability and/or higher mechanical strength and/or higher wear resistance upon tribological stressing than the first body region by formation of a multiplicity of, in particular finely, distributed, in particular heat-resistant and/or wear-reducing, phases (precipitations) in the second body region by means of the additive manufacturing method. Alternatively or additionally, the second body region has higher thermal stability and/or higher mechanical strength, in particular at homologous temperatures of greater than or equal to 0.5 (i.e. high homologous temperatures), and/or higher wear resistance upon tribological stressing than the first body region by means of a higher content of alloy elements than the first body region. By means of the higher content of alloy elements, more, in particular distributed and/or heat-resistant and/or wear-reducing phases or precipitations, can be produced by means of the additive manufacturing method than in the case of the first body region.

High thermal stability can expediently be understood as meaning that the precipitations which are present only dissolve or are moulded at higher temperatures, in particular high homologous temperatures, of greater than 0.5.

In particular, a homologous temperature can be understood as meaning a ratio of the temperature T of a material to the melting point $T_S$ thereof.

Precipitations which are thermally stable at homologous temperatures above $0.5\,T_s$ or in particular above $0.7\,T_s$ of the base material can expediently be considered to be heat-resistant. Precipitations having lower thermal stability in aluminium alloys can be, for example, $Mg_2Si$ precipitations and $Al_2Cu$ precipitations.

In particular, a fine, distribution and a formation of the heat-resistant and/or wear-reducing phases can arise, for example automatically, during the additive manufacturing by means of a high solidification rate.

For example, an, in particular fine, distribution of the heat-resistant and/or wear-reducing phases can be checked on metallographic cross sections under an optical microscope or in particular under a scanning electron and transmission electron microscope and also in tomographical atom probes (also referred to as three-dimensional atom probes).

In a further exemplary embodiment, the second body region has an, in particular thermally and/or mechanically stressed (for example produced by combustion, friction, etc.) component surface of the component. The high thermal stability, the high mechanical strength and/or the high wear resistance upon tribological stressing of the second body region can therefore be used in an advantageous manner to counteract the high thermal and/or mechanical stressing on the component surface.

Given high alloy contents, a finely structured, skeleton-like precipitation structure (for example casting phase structure composed of intermetallic phases) with heat-resistant intermetallic phases can form in the second body region. The precipitation structure is significantly more finely structured than, for example, in cast aluminium pistons. That is to say, the size of the precipitation particles is less than 2 μm, less than 1 μm and particularly less than 500 nm. Consequently, the strains at phase boundaries are reduced, and the cohesion strength of the precipitation phases is achieved only under significantly higher mechanical or thermomechanical stresses than in components produced conventionally by casting or forging. At the same time, a load transfer into the precipitation skeleton takes place via the three-dimensionally cross-linked structure of said fine cast phases, and the mechanical properties are improved in particular at high homologous temperatures. Greater amounts of finely distributed secondary precipitations can also be formed in the aluminium, iron or copper matrix by means of the increased cooling rates and the associated increased oversaturation of the matrix with foreign elements. Said precipitations have sizes within the range of typically 1 nm to 500 nm and additionally increase the mechanical strength.

In one exemplary embodiment, the first body region is formed from steel or an aluminium alloy. As a result, the first body region and therefore the component can expediently be produced cost-effectively.

In a further embodiment, the first body region is a piston blank (for example having piston skirt, bolt bores, piston lower side, piston cooling duct, piston cooling gallery (in particular completely)) of a piston of an internal combustion engine. Alternatively or additionally, the second body region substantially has at least one portion of a piston head (for example combustion surface) of a piston, in particular a depression edge of the piston head. Consequently, the thermally highly stressed piston head of the piston that faces a combustion chamber of the cylinder can be formed by the second body region with the high thermal stability thereof. Other portions of the piston which are subjected to less thermal stressing can, by contrast, be formed cost-effectively in a conventional manner by the first body region.

In a further variant embodiment, the second body region is in the form of a coating (for example having a plurality of layers of additively applied material). Alternatively or additionally, the second body region has a material thickness which is less than a material thickness of the first body region and/or is less than 20 mm, 15 mm or 10 mm and/or is greater than 0.3 mm, 1 mm, 2 mm or 3 mm. By means of the comparatively small size of the second body region, the outlay and the costs for forming the second body region can be reduced.

In one embodiment, the second body region is built up directly on the first body region. Alternatively or additionally, the second body region after its production is connected to the first body region, in particular by friction welding, induction welding, laser welding, a hybrid welding method or the like. There is therefore both the possibility of building up the second body region integrally on the first body region or else of first of all producing the second body region separately in order then to connect same to the first body region.

In a further embodiment, the additive manufacturing method takes place in the powder bed method, wherein the fusing of a metallic powder or of a plurality of different metallic powders takes place in particular by means of electron beam or laser beam.

By means of the different content of one or more alloy elements, a number of, in particular heat-resistant and/or wear-reducing phases (precipitations) which are produced during the additive manufacturing method can be changed. In particular, it is thus possible to produce one or more portions which have more heat-resistant phases and/or wear-reducing phases than other portions of the second body region.

For example, in particular the thermal stability and/or the mechanical strength and/or the wear resistance at a thermally and/or mechanically highly loaded surface of the second body region can be provided to be particularly great. It is also possible for the thermal stability at a contact surface of the second body region with respect to the first body region to be provided to be smaller than at the thermally highly loaded surface.

In a development, an alloy content of Mg, Si and/or Cu is reduced (for example gradually, by degrees, successively, step by step or layer by layer) in the second body region with increasing distance from the first body region (for example distance from a contact surface of the first body region in contact with the second body region) and/or with decreasing distance from the component surface of the second body region.

Alternatively or additionally, an alloy content of Ni, Fe, Mn, Zr, V, Ti, Nb, Sc, Mo, Co, Cr, Hf, Ta, W, Re, Al, P and/or Si is increased (for example gradually, by degrees, successively, step by step or layer by layer) in the second body region with increasing distance from the first body region (for example distance from a contact surface of the first body region in contact with the second body region) and/or with decreasing distance from the component surface of the second body region.

An alloy content of one or more alloy elements can expediently be increased or reduced in such a manner that thermal stability of the second body region is increased (for example gradually, by degrees, successively, step by step or layer by layer) with increasing distance from the first body region and/or with decreasing distance from the component surface of the second body region.

In one exemplary embodiment, the method furthermore comprises heating (in particular targeted section by section and/or periodically) and/or cooling (in particular targeted section by section and/or periodically) of the component before, during and/or after formation of the second body region. The component properties can therefore be expediently optimized. For example, the component properties can be controlled and improved by preliminary heating or targeted cooling during the additive manufacturing.

For example, by means of the increased cooling rates during cooling the structure, inter alia, can be refined even further. Furthermore, increased oversaturation of the matrix and therefore reinforced solid solution strengthening and precipitation hardening can be possible. By means of targeted heating, inter alia, strains in the component can be reduced and also a reduction in distortion is possible.

In a further exemplary embodiment, the method comprises heat treating the component after formation of the second body region. An improvement in the properties of the component can be obtained by the downstream heat treatment.

The present disclosure is also directed towards a component, in particular vehicle component and/or engine component (for example part of a motor vehicle engine, stationary engine, gas engine, diesel engine, petrol engine, turbine, etc.), such as a piston of an internal combustion engine, which piston is produced by a method as disclosed herein.

It is also possible to use the method for producing other, in particular thermally and/or mechanically highly stressed, vehicle components and/or engine components and/or other components.

The present disclosure is also directed towards a vehicle (for example motor vehicle), in particular a utility vehicle (for example lorry or bus), with a vehicle component which is produced by a method as disclosed herein.

BRIEF DESCRIPTION OF THE DRAWINGS

The previously described embodiments and features of the disclosure can be combined with one another as desired. Further details and advantages of the disclosure will be described below with reference to the attached drawings, in which.

The embodiments shown in the figures at least partially corresponds, and therefore similar or identical parts are provided with the same reference signs and reference is also made for the explanation thereof to the description of the other embodiments or figures in order to avoid repetitions.

DETAILED DESCRIPTION

Figure 1:
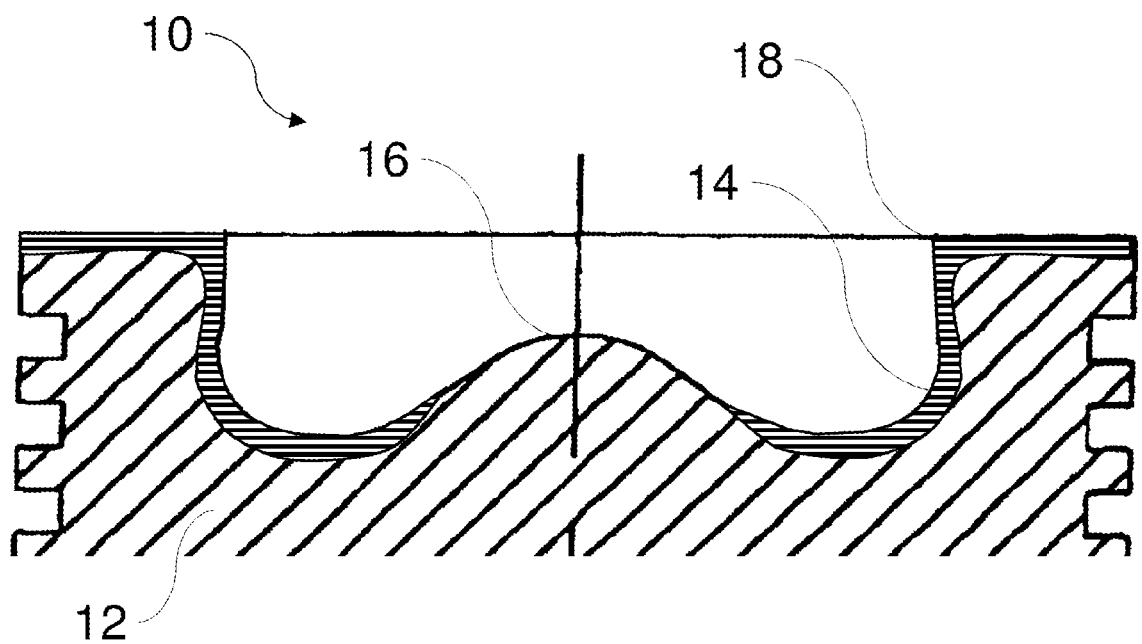
FIG. 1 shows a portion of an exemplary piston upper part of a piston of a reciprocating piston internal combustion engine according to the present disclosure.

FIG. 1 shows a piston upper part of a piston 10 of an internal combustion engine, for example of a motor vehicle. The piston 10 herein is described as a exemplary embodiment for the production method according to the disclosure. However, it is also possible to produce other components, such as, for example, other engine components of an internal combustion engine or components of a turbine, according to the method according of the disclosure. In particular, components which have a component surface which is thermally and/or mechanically (greatly) stressed during operation are suitable for the method according to the disclosure. The vehicle component can be a component of a motor vehicle, in particular of a utility vehicle, for example of a bus or of a lorry.

The piston 10 can be produced integrally as one piece as what is referred to as a monoblock. Alternatively, the piston 10 can be built up in multiple parts, wherein the plurality of parts are connected to one another, for example, by means of releasable or non-releasable connecting means.

The piston 10 is formed from a first body region 12 and a second body region 14. Only part of the first body region 12 is illustrated. The first body region 12 is formed by a piston blank. The second body region 14 comprises at least one portion of a piston head 16 of the piston 10. In the embodiment illustrated, the second body region 14 is substantially provided in the region of a depression edge 18 of the piston head 16. The second body region 14 extends annularly. It is also possible for the body region 14 to extend, for example, in a planar manner. The second body region 14 is arranged, for example symmetrically about a centre longitudinal axis of the piston 10. During the operation of the internal combustion engine, the depression edge 18, in particular, is exposed to high thermal loadings. The piston 10 on account of its production method is capable of withstanding the high thermal loadings in particular in the region of the piston head 16 during the operation. The piston 10 can nevertheless be used in practice since the outlay and the costs for the production of the piston 10 are kept within economically adjustable extents.

The first body region 12 forms a main body region while the second body region 14 only forms a partial body region, in particular an edge body region. The first body region 12 is directly connected to the second body region 14. In particular, the first body region 12 merges into the second body region 14. The second body region 14 has a smaller material thickness than the first body region 12. In particular, a material thickness of the second body region 14 is less than 20 mm. For example, the second body region 14 can be in the form of a coating of the first body region 12.

The method for producing the piston 10 is designed as a hybrid method. The first body region 12 and the second body region 14 are produced by different manufacturing methods.

The first body region 12 is produced by means of a conventional manufacturing method, for example casting or forging. The first body region 12 is produced from a basic material, in particular from steel or an aluminium alloy. The first body region 12 can therefore be formed comparatively cost-effectively.

The second body region 14 is produced, in particular layer by layer, by means of an additive manufacturing method. The second body region 14 is composed of an aluminium alloy. It is also possible for the second body region to be composed of an iron-based alloy (for example steel, cast iron alloy) or a copper-based alloy. The second body region 14 is alloyed in such a manner than the second body region 14 has greater thermal stability or heat resistance than the first body region 12. The second body region 14 can have an increased content of alloy elements. In particular, the additive manufacturing method permits the formation of a plurality of, in particular very finely, distributed heat-resistant phases or precipitations which lead to great thermal stability of the second body region 14. In particular, by means of the additive manufacturing method, the second body region 14 by formation of the multiplicity of heat-resistant phases can achieve thermal stability and/or mechanical strength of a magnitude that would not be possible by means of a conventional manufacturing method which is used for producing the first body region 12.

By means of the conventional production method, the first body region 12 is produced separately from the second body region 14. The second body region 14 can be produced separately from the first body region 12. The second body region 14 after its production can then be fixedly connected to the first body region 12, in particular by friction welding or laser welding. However, it is also possible for the second body region 14 to be built up directly onto the first body region 12. Before, during or after the second body region 14 is grown on/built up, the first body region 12 can be connected to other, for example, conventionally manufactured component regions. The connection can be produced, for example, by friction welding, induction welding, laser welding or a hybrid welding method.

In order to produce the second body region 14, a metallic powder or a plurality of different metallic powders are fused, for example, in a powder bed method. For example, the first body region 12 which is in the form of a piston blank can be positioned in a plant for additive manufacturing. The second body region 14 is then built up directly on the first body region 12 by fusing of the metallic powder or of the metallic powders. The fusing of the metallic powder can take place, for example, by means of electron beam or laser beam. The additive production method can comprise, for example, laser sintering or laser melting.

The surface of the second body region 14, in particular, is exposed to high thermal and/or mechanical loadings. The thermal loadings can be smaller in the direction of the piston interior. It can therefore be provided, for example, that the second body region 14 has a gradation of alloy elements. Put in other words, the second body region 14 can have a changing (for example increasing or decreasing) content of alloy elements with a changing distance from its surface. By means of the gradation, it is possible, for example, by means of a comparatively high or low content of certain alloy elements in the region of the surface, for particularly high thermal stability and high mechanical strength to be achieved at low and high homologous temperatures in this region.

For example, an alloy content of Mg, Si and/or Cu can be reduced in the second body region 14 with increasing distance from the first body region 12 and/or with decreasing distance from the surface of the second body region 14. It is also possible, for example, for an alloy content of Ni, Fe, Mn, Zr, V, Ti, Nb, Sc, Mo, Co, Cr, Hf, Ta, W, Re, Al, P and/or Si to be increased in the second body region 14 with increasing distance from the first body region 12 and/or with decreasing distance from the surface of the second body region 14.

Figure 2:
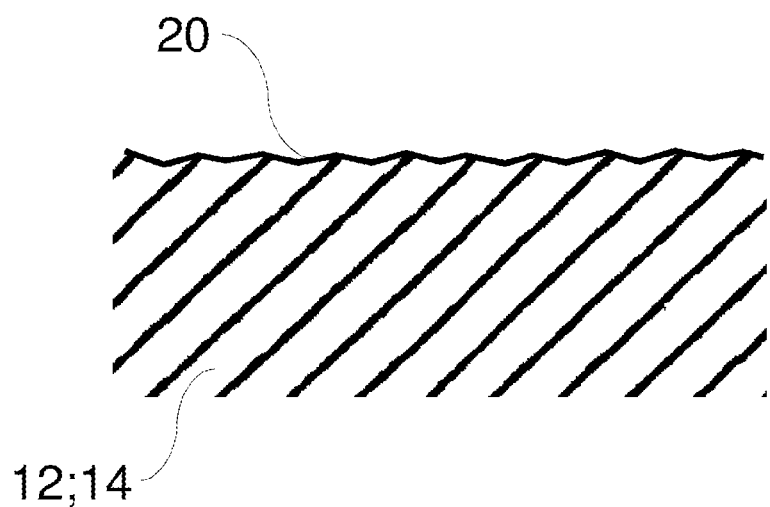
FIG. 2 shows a portion of an exemplary first and second body region of a vehicle component according to the present disclosure.

FIG. 2 illustrates a contact surface 20 of the first body region 12 and of the second body region 14. At the contact surface 20, the first body region 12 and the second body region 14 are in contact when they have been or are connected to each other. In particular, it is shown in FIG. 2 that the contact surface 20 of the first body region 12 and/or of the second body region 14 can be roughened in order to permit a fixed connection between the first body region 12 and the second body region 14 and/or to increase the adhesive strength of the connection. The contact surface 20 of the first body region 12 is expediently roughened when the second body region 14 is built up directly on the first body region 12. In this case, the contact surface 20 is roughened before the second body region 14 is built up. In another case in which the second body region 14 is initially produced separately in order to be subsequently connected to the first body region 12, additionally or alternatively, however, the contact surface 20 of the second body region 14 can also be roughened.

The contact surface 20 may be roughened by means of laser beam or electron beam. It is possible for the roughening of the contact surface 20 to take place in the same manufacturing plant as the production of the second body region 14.

It is also possible to improve the properties of the piston 10, in particular of the second body region 14, by targeted cooling and/or heating before, during or after production. Heat treatment can expediently also be undertaken after the production of the piston 10.

Figure 3:
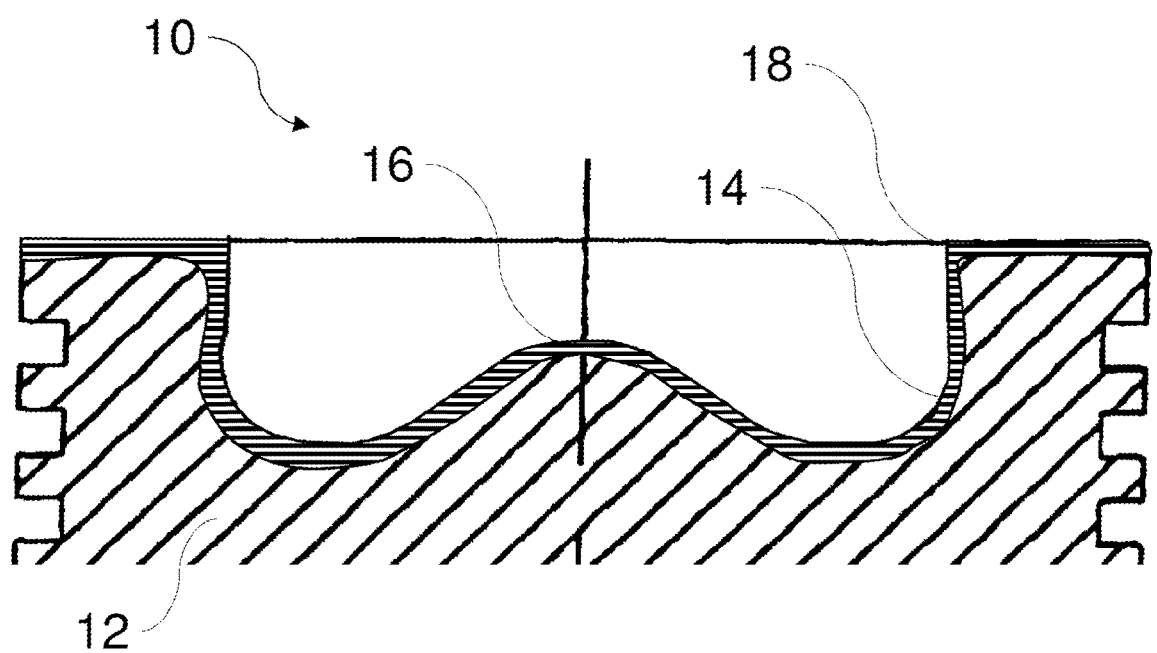
FIG. 3 shows a portion of a further exemplary first and second body region of a vehicle component according to the present disclosure.

FIG. 3 shows a further exemplary embodiment. The second body region 14 is provided here in a planar manner in the region of the depression edge 18 and of the piston head 16 (including the depression and the central dome) of the piston 10. Put in other words, the second body region 14 entirely comprises a combustion surface of the piston 10 that faces the combustion chamber.

The disclosure is not restricted to the exemplary embodiments described above. On the contrary, a multiplicity of variants and modifications are possible which likewise make use of the inventive concept and therefore fall within the scope of protection.

LIST OF REFERENCE SIGNS

10 Piston
12 First body region
14 Second body region
16 Piston head
18 Depression edge
20 Contact surface

The invention claimed is:

1. A method for producing a component, comprising:
    forming a first body region, and
    forming a second body region, which is connected to the first body region, from an aluminium alloy or an iron-based alloy or a copper-based alloy by means of an additive manufacturing method, wherein the second body region is alloyed in such a manner that the second body region has higher thermal stability, higher mechanical strength or higher wear resistance upon tribological stressing than the first body region.

2. The method according to claim 1, wherein:
    a metallic powder is fused in the additive manufacturing method in order to form the second body region, or
    a plurality of different metallic powders are fused in the additive manufacturing method in order to form the second body region.

3. The method according to claim 1, wherein:
    the second body region has a graded alloy content or is alloyed inhomogenously; or
    an alloy content of an alloy element or of a plurality of alloy elements changes in the second body region with increasing distance from the first body region or with decreasing distance from a component surface of the second body region.

4. The method according to claim 1, furthermore comprising:
    roughening a contact surface, which is to be connected to the second body region, of the first body region, or
    roughening a contact surface, which is to be connected to the first body region, of the second body region.

5. The method according to claim 4, wherein the roughening is by means of laser roughening or electron beam roughening.

6. The method according to claim 4, wherein:
    the roughening of the contact surface and the forming of the second body region are carried out in the same manufacturing plant.

7. The method according to claim 1, wherein:
    the second body region has higher thermal stability or higher mechanical strength or higher wear resistance upon tribological stressing than the first body region by formation of a multiplicity of distributed heat-resistant or wear-reducing phases in the second body region by the additive manufacturing method; or
    the second body region has higher thermal stability or higher mechanical strength or higher wear resistance upon tribological stressing than the first body region by means of a higher content of alloy elements than the first body region.

8. The method according to claim 1, wherein:
    the second body region has a thermally or mechanically stressed component surface of the component.

9. The method according claim 1, wherein:
    the first body region is formed from steel or an aluminium alloy.

10. The method according claim 1, wherein:
    the first body region is a piston blank of a piston of an internal combustion engine; or
    the second body region has at least one portion of a piston head of a piston.

11. The method according to claim 10, wherein the at least one portion of the piston head of the piston is a depression edge of the piston head.

12. The method according to claim 1, wherein:
    the second body region is in the form of a coating; or
    the second body region has a material thickness which is less than a material thickness of the first body region or is less than 20 mm.

13. The method according to claim 1, wherein:
    the second body region is built up directly on the first body region; or
    the second body region after its production is connected to the first body region by one or more of friction welding, induction welding, laser welding or a hybrid welding method.

14. The method according to claim 1, wherein:
    the additive manufacturing method is a powder bed method and a fusing of a metallic powder or of a plurality of different metallic powders uses an electron beam or a laser beam.

15. The method according to claim 1, wherein:
    an alloy content of Mg, Si or Cu is reduced in the second body region with increasing distance from the first body region or with decreasing distance from the component surface of the second body region; or
    an alloy content of Ni, Fe, Mn, Zr, V, Ti, Nb, Sc, Mo, Co, Cr, Hf, Ta, W, Re, Al, P or Si is increased in the second body region with increasing distance from the first body region or with decreasing distance from the component surface of the second body region.

16. The method according to claim 1, furthermore comprising:
    heating or cooling the component before, during, or after the formation of the second body region; or heat treating the component after the formation of the second body region.

17. The method according to claim 1, wherein the component is a vehicle component, an engine component, or a piston.

18. The method according to claim 1, wherein the first body region is formed by casting or forging.

19. The method according to claim 1, wherein:
the second body region has higher thermal stability or higher mechanical strength at homologous temperatures of greater than or equal to 0.5 than the first body region by means of a higher content of alloy elements than the first body region.

20. The method according to claim 1, wherein:
the second body region has a material thickness which is greater than 0.3 mm.

* * * * *